July 1, 1941.  M. T. ZAROTSCHENZEFF ET AL  2,247,865
METHOD AND APPARATUS FOR FREEZING
Filed Dec. 9, 1936   2 Sheets-Sheet 2
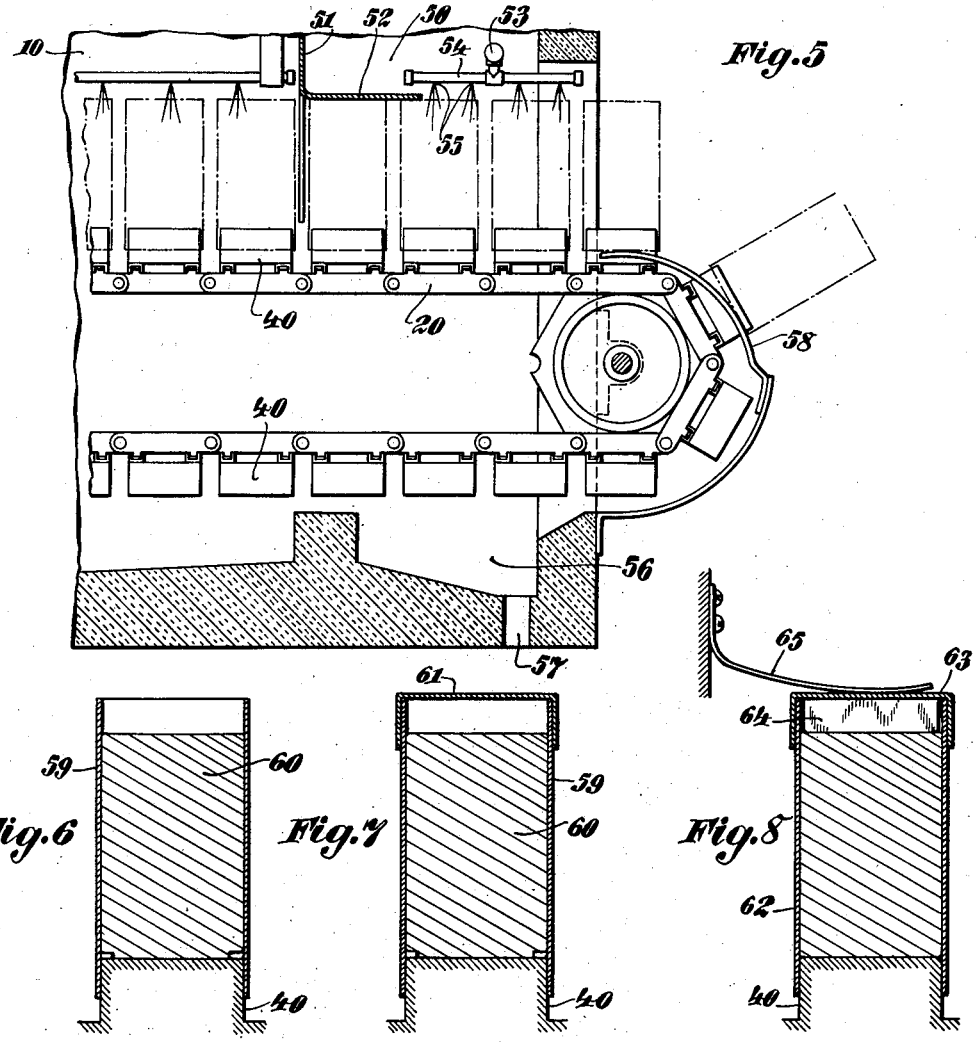
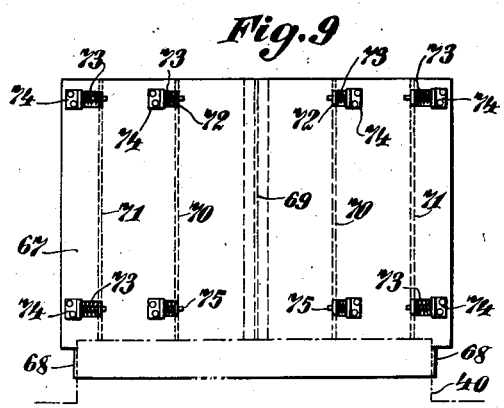
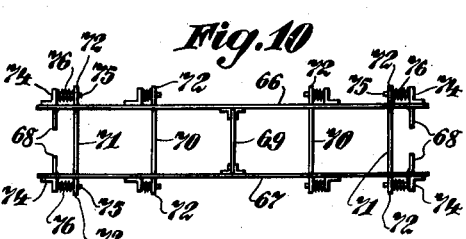
INVENTORS:
Mikail T. Zarotschenzeff,
Earl Stafford and
Charles H. Welling,
BY Hoguet, Neary & Campbell,
Their ATTORNEYS Patented July 1, 1941

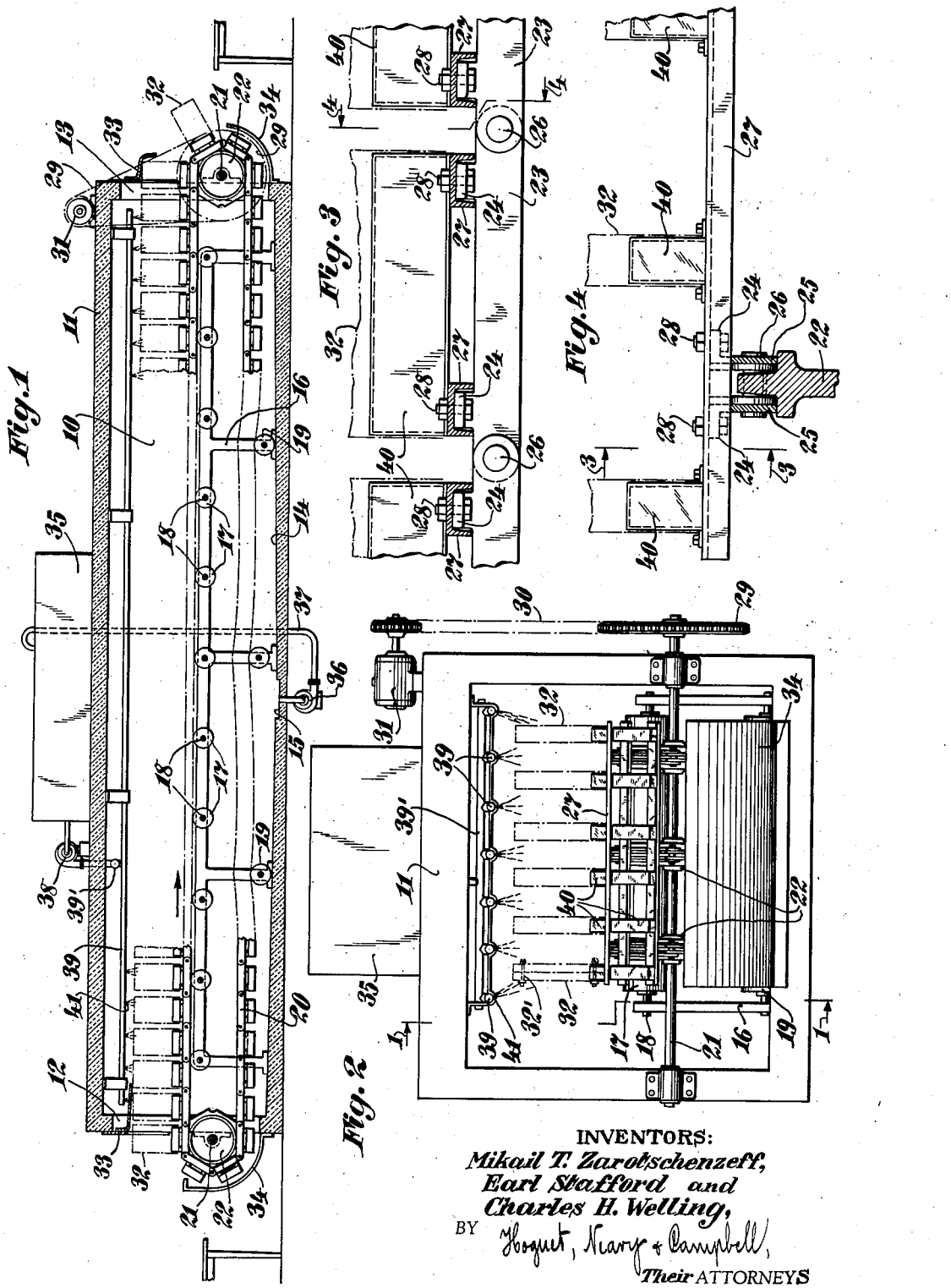

2,247,865

UNITED STATES PATENT OFFICE 2,247,865

METHOD AND APPARATUS FOR FREEZING

Mikail T. Zarotschenzeff, New York, N. Y., Earl Stafford, North Reading, Mass., and Charles H. Welling, New Canaan, Conn., assignors to Z Pack Corporation, Jersey City, N. J., a corporation of Delaware Application December 9, 1936, Serial No. 114,900

13 Claims. (Cl. 62—104)

The present invention relates to apparatus by means of which food products may be frozen and embodies, more specifically, a process and apparatus whereby a freezing medium may be applied to food products in such fashion as to cause the medium to be subjected to effective heat interchange relationship with the food products whereby quick freezing of the latter is effectively carried out.

Numerous forms of apparatus have heretofore been provided wherein food products are applied to a suitable conveyor mechanism and carried through a freezing chamber, the travel through such chamber taking place under such conditions as to cause a quick freezing medium to freeze the food products while the latter travel through the chamber. Certain devices of this character have included upper and lower imperforate flexible metal conveyor members between which the food products are presented in such fashion that heat is extracted from the food products by conduction through the conveyor plates and absorbed by the freezing medium. The present invention provides an improved form of freezing apparatus and method of quick freezing wherein the food products are handled and frozen more effectively than in existing devices.

In accordance with the present invention, it has been found that the time required to effect a quick freezing operation is largely dependent upon the rapidity with which the freezing medium is applied to the heat conductive surfaces in contact with the food products and upon the time in which the portion of the freezing medium which has absorbed heat from the heat conducting surfaces is removed from such surfaces to be reconditioned and recirculated and to permit additional freezing medium to replace the warmed medium. Accordingly, the present invention is addressed particularly to the problem of applying and removing medium from the heat conducting surfaces in contact with food products.

A further object of the invention is to provide a container in which food products may be quick frozen, such container being relatively wide and flat in order that the container may have a substantial volume and yet maintain the food products, during the quick freezing operation, in a relatively close proximity to the freezing medium, at all portions thereof.

A further aspect of the invention is the quick freezing of food products in such fashion as to provide a frozen product of uniform shape and character in order that wrapping, distribution, and sale may be facilitated. In this respect, the present invention provides a means whereby the expansion of the food products during freezing is restrained in all but one direction, the food product being maintained out of contact with the freezing medium during the quick freezing operation.

A further object of the invention is to provide, in a device for quick freezing food products, receptacle mechanism by means of which expansion of the products during freezing may be accommodated without subjecting the products to the direct contact of the freezing medium.

In addition to the foregoing objects and advantages of the present invention, other advantages such as in the handling, supervision and economy of the freezing operation, as well as further advantages, result, and, in order that the invention may be understood more fully, it will now be described in greater detail in connection with the accompanying drawings wherein:

Figure 1 is a view in longitudinal section taken through a freezing device constructed in accordance with the present invention. The plane on which the section of Figure 1 is taken is illustrated by the line 1—1 of Figure 2.

Figure 2 is a view in end elevation taken from the right as viewed in Figure 1, and with the closure elements on the end of the device removed.

Figure 3 is an enlarged view in section of a portion of the conveyor shown in Figures 1 and 2. This view is taken on the line 3—3 of Figure 4 looking in the direction of the arrows.

Figure 4 is a view in section taken on line 4—4 of Figure 3 and looking in the direction of the arrows.

Figure 5 is a view similar to Figure 1, showing a portion of a freezing mechanism wherein means is provided to facilitate removal of the container from the supporting means during the freezing operation.

Figure 6 is a sectional view showing one form of container carrying food products and the manner in which it is mounted during the freezing operation.

Figure 7 is a view similar to Figure 6 showing a further modified form of the invention.

Figure 8 is a view similar to Figure 7 showing a further form of container.

Figure 9 is a view in side elevation showing a further modified form of container which is so constructed as to accommodate expansion of the food products during freezing.

Figure 10 is a plan view of the container shown in Figure 9.

With reference to the above drawings, a freezing chamber is shown at 10, the chamber being formed by an elongated housing or tunnel 11 provided with openings 12 and 13 in the ends thereof. The bottom of the chamber 10 is preferably provided with sloping floor surfaces 14 which terminate in a sump 15 in which freezing medium may collect. Suitable side frame members 16 are preferably mounted on the sides of the tunnel 11 and are provided with a plurality of rollers 17 which are mounted on shaft 18 journaled in the side frame members 16. Lower rollers 19 are carried between side frame members 16 and serve to support the lower span of an endless conveyor 20 which is supported by the rollers 17 in the upper span thereof.

In each end of the tunnel 11, shafts 21 are provided, each shaft being formed with a plurality of driving wheels 22 which are adapted to engage the segments of conveyor 20 and properly tension the conveyor as well as to enable the same to be driven in the manner to be described presently. Figure 1 illustrates the manner in which the lower span of the conveyor is supported on the rollers 19.

As illustrated in Figures 3 and 4, the conveyor 20 consists of a plurality of similar conveyor sections 23 each being formed, in the construction shown, by three longitudinal links having horizontal flange portions 24. Each of the links is formed of spaced members 25, integral with the flanges 24 and connected to the adjacent ends of the adjacent links by means of hinge pins 26. In this fashion, the driving wheels 22 are received between the spaced members 25 of the links 23 as illustrated in Figure 4, and the conveyor is thus effectively supported and driven. Each transverse series of links 23 is mounted as a unit on transversely extending inverted U shaped channels 27, being secured to the flanges 24 by means of bolts and nuts 28. Transversely spaced upon the channels 27 are a plurality of supporting blocks 40, these blocks serving to support containers in which food products have been placed for the freezing operation.

One of the shafts 21 is provided with a drive sprocket 29 which is driven by a suitable chain indicated in dot-dash lines at 30 through a driving motor 31. In this fashion, the conveyor 20 may be driven at any desired speed to cause containers for food products such as shown in dot-dash lines at 32 to be moved through the tunnel 11 at a suitable speed in order to effect freezing of the food products during the travel thereof through the chamber 10.

In practice the containers 32 are preferably of good heat conductive characteristics and are filled to a desired extent with the food products to be frozen. These containers may be split in half and held together by suitable clamping means such as hinged clamps 32'. The containers are then placed with their open ends over the blocks 40 and, in this fashion, the freezing operation takes place in such fashion as to restrain expansion of the food products in all directions save toward the open ends of the containers. Inasmuch as the containers are relatively thin, the food products contained therein are in close proximity to the freezing medium throughout every section thereof. Moreover, by handling all the food products in this fashion, they may be effectively packed in the containers and frozen with a minimum number of voids throughout the products.

In order to carry out the freezing operation in an even manner, the ends of the chamber are preferably enclosed by means of flaps or the like as is illustrated at 33 and lower closures 34 are provided to enclose the lower ends of the openings 12 and 13.

A freezing medium is effectively applied to the containers on the conveyor 20 through a circulating system comprising a heat interchange device 35 which may be conveniently located above the tunnel 11. A pump 36 is provided to remove the freezing medium from the sump 15 and, through pipe 37, return the medium to the heat interchange device 35. After reconditioning the freezing medium a high speed pump 38 forces the freezing medium into longitudinally extending pipes 39 through one or more transversely extending manifolds 39'. The pipes 39 are provided with spaced nozzles 41, the nozzles being so positioned as to direct the freezing medium downwardly over the sides of the containers 32 as illustrated in Figures 1 and 2. This action of the freezing medium is such as to sweep the parallel sides of the containers and thus effectively apply the refrigerant to the extended surfaces thereof. Moreover, the sweeping action of the refrigerant is such as to effectively remove the particles of the refrigerant which have contacted the surfaces of the containers 32 and replace them with freezing refrigerant in order to accelerate the freezing operation. In addition to the sweeping action of the refrigerant over the extended surfaces of the containers, the action of gravity further facilitates the removal of the warmed refrigerant from the sides of the containers and, inasmuch as the containers are inverted over the block 40, the food products therein are effectively protected from the refrigerant.

In the construction shown in Figure 5 the freezing chamber 10 is provided with an auxiliary compartment 50, preferably formed by a partition member 51, which may be provided with suitable flaps 52 to separate the compartments more effectively. In the compartment 50, a header 53 is mounted, the header being provided with a plurality of pipes 54 being formed with apertures or nozzles at 55 by means of which water may be sprayed upon the sides of the containers carried by the blocks 40. This water serves to defrost the containers and facilitate removal of the contents thereof. After the water has served this purpose, it falls into a sump 56 and passes through an outlet 57. If desired, the containers may be removed automatically from the blocks 40 by means of cams 58 which engage the lower edges of the containers and lift them from the blocks 40 as the conveyor 20 advances.

In Figure 6 a form of container is shown wherein the container 59 is open at the top and bottom and is adapted to receive food products indicated by the diagonal lines at 60. The freezing operation, in containers of this type, takes place by the application of the brine to the sides of the containers beneath the open top thereof, whereby contamination of the contents within the container by the freezing medium is avoided. In order that the food products may be effectively preserved, the operation of the mechanism with containers of the type shown in Figure 6 preferably contemplates filling of the containers to a level below the top of the container as illustrated, for example, in Figure 6.

In Figure 7 the container shown in Figure 6 is provided with a removable cover 61 in order that the food products may be effectively preserved against contamination where it is desired to use the container in mechanisms in which the brine spray might otherwise enter the container.

In the construction shown in Figure 8, a container 62 is provided similar in construction to the container 59, but having a cover 63 within which a pressure block 64 is provided. When the container is placed upon the conveyor and filled with a food product to be frozen, the cover 63 is applied and, as the conveyor advances, the container into the freezing chamber, a spring 65 may be provided to force the cover and block 64 downwardly, thus insuring the proper shaping of the food products by the container and block 64.

In the construction shown in Figures 9 and 10, the container is shown as being formed of parallel side plates 66 and 67. These side plates may be formed with end flanges 68 to locate the same properly upon the blocks 40 and in an intermediate partition 69 may be provided. Upon either side of the partition 69, auxiliary partitions 70 and 71 are mounted. The partitions 70 and 71 are formed with ears 72 which extend through apertures 73 in the side plates 66 and 67. Brackets 74 are mounted upon the outer sides of the side plates 66 and 67 and are provided with guide rods 75 upon which springs 76 are received. In this fashion, as the food products within the container expand during freezing, the partition members 70 and 71 yieldingly move to accommodate such expansion. Inasmuch as the food products between the partition members 70 and 71 must be displaced to accommodate the expansion of the food products between the members 69 and 70, guide members 75, upon which the partition members 71 are mounted, may be provided of sufficient length to accommodate such motion.

In practice it has been found that a low temperature brine serves as an effective refrigerating medium, the materials of the conveyors, containers and associated parts being such as not to be effected by the brine. Not only is the refrigerant efficiently applied to the containers in which the food products are positioned, thus absorbing a much greater amount of heat by the refrigerant, but the rapidity with which the freezing operation takes place is greatly accelerated by the sweeping and gravitational action of the refrigerant upon the heat conducting surfaces of the containers. Moreover, as above noted, the food products are conveniently handled and effectively frozen in such fashion as to restrain expansion thereof in all but one direction. Inasmuch as the containers are relatively thin, that is, wide and flat, the freezing medium becomes rapidly effective upon the most remote portions of the food products in the containers. Obviously, in connection with this aspect of the invention, the container may be provided with a closure at the open end which does not contact with the food products within the container, thus permitting growth of the products. Moreover, the construction may be such as to cause the container to be supported with its open end out above the line of spray, or in the event that the open end of the container is at a lateral side of the container rather than open at the top or bottom side, the open end may be outside of the line of spray to prevent contamination of the food products therein by the spray.

It will be seen that one aspect of the invention contemplates a method of freezing bulk products wherein a mass of the product is packed between two substantially parallel and non-yielding heat-conducting plates which are spaced at a relatively fixed distance which is substantially less than either dimension of the mass parallel to the plate, restraining the mass in the other two directions or planes in such fashion as to permit the mass to expand to relieve pressure generated therein during freezing, and freezing the mass by continuously supplying a liquid refrigerant to the sides of the heat-conducting plates. The restraining of the mass in directions parallel to the relatively non-yielding heat-conducting plates is effected by means of the series of walls or partitions which are mounted in such fashion as to yield in at least one direction to relieve the pressure generated during freezing.

While the invention has been described with reference to the specific construction shown in the accompanying drawings, it is not to be limited, save as defined in the appended claims.

We claim:

1. Apparatus for freezing food products comprising a chamber forming means, means in the chamber to support food products, means in the chamber to position the last named supporting means, a container for food products having closely spaced side walls mounted on said support with said side walls perpendicular to said support and means on one side of the positioning means and on opposite sides of the supporting means to direct a refrigerant against the side walls of the container and toward the supporting means.

2. Apparatus for freezing food products comprising an elongated chamber forming means having access means at each end thereof, a conveyor extending between the access means, food product supporting means on the conveyor, a container telescopically supported on the supporting means and in which food products are adapted to be received, and spaced means above the conveyor and extending lengthwise thereof to direct a refrigerant downwardly against and along sides of the container.

3. Apparatus for freezing food products comprising an elongated chamber forming means having access means at each end thereof, a conveyor extending between the access means, food product supporting means on the conveyor, a container removably supported on the supporting means and receiving a portion of the supporting means telescopically, said container being adapted to receive food products, and spaced refrigerant spraying means disposed above the conveyor and extending lengthwise thereof to direct a refrigerant against and downwardly along sides of the container.

4. Apparatus for freezing food products comprising a chamber forming means, food product supporting means in the chamber, a container having open ends removably supported on and with one end closed by the supporting means and in which food products are adapted to be received, a cover telescopically enclosing the other end of the container and shiftable relatively to the container to compensate for the expansion of the food products, and means for directing refrigerant against sides of the container.

5. Apparatus for freezing food products comprising a chamber forming means, food product supporting means in the chamber, a container having open ends removably supported on and with one end closed by the supporting means and in which food products are adapted to be received, a cover for the other end of the container, means on the cover disposed within the container and engaging the contents thereof, and means for directing refrigerant against sides of the container.

6. The method of freezing a bulk product which comprises placing a mass of the product between two substantially parallel and closely spaced, fixed heat conducting plates, maintaining said plates in substantially fixed closely spaced relationship to confine the mass therebetween and prevent substantial growth in a direction transversely of the plates, yieldingly restraining the mass in at least one direction and restraining it against growth in other directions parallel to the plates to relieve pressure during freezing, and freezing the mass by directing a liquid refrigerant against the sides of the plates in spray form to sweep and flush them with rapidly replaced refrigerant.

7. The method of freezing a bulk product which comprises placing a mass of the product between two substantially parallel and closely spaced vertical heat conducting plates, maintaining said plates in substantially fixed closely spaced relationship to confine the mass therebetween and prevent substantial growth in a direction transversely of the plates, said plates being spaced apart a fixed distance substantially less than either dimension of the mass parallel to the plates, yieldingly restraining the mass in at least one direction and restraining it against growth in other directions parallel to the plates to relieve pressure during freezing, and freezing the mass by directing a liquid refrigerant against the sides of the plates in spray form to sweep and flush them with rapidly replaced refrigerant.

8. In a refrigerating device, the combination of a chamber, a conveyor in said chamber having a block projecting from its outer surface, a container for food products having an open end telescopically receiving the block, and means in the chamber for directing a refrigerant against the sides of the container.

9. Apparatus for freezing food products comprising a chamber forming means, food product supporting means in the chamber, an elongated open ended container having a rectangular cross section removably supported with longitudinal axis substantially vertical and an open end adjacent to the supporting means enclosing a portion of said supporting means to close the said end of the container and in which food products are adapted to be received, and means to direct a refrigerant in spray form against sides of the container.

10. Apparatus for freezing food products comprising a chamber, means in the chamber to support food products, an elongated container having an open end removably mounted on and with its longitudinal axis perpendicular to the supporting means, and means on opposite sides of the supporting means to direct a refrigerant downwardly toward the supporting means to provide rapid freezing of the food products, and means for closing the open end of and shiftable relative to the container to allow expansion of the food product during freezing.

11. Apparatus for freezing food products comprising a chamber, means in the chamber to support food products, means in the chamber to move the supporting means therethrough, an elongated container having open ends adapted to be removably supported on, with its longitudinal axis perpendicular to and one end closed by the supporting means and in which food products are adapted to be received, means above and on opposite sides of the supporting means and extending in a direction parallel to the path of movement of the moving means to direct a refrigerant downwardly toward the supporting means and along sides of the container and means closing another end of and shiftable relatively to the container to allow expansion of the food product during freezing.

12. Apparatus for freezing food products comprising a chamber forming means, food product supporting means in the chamber, a container having open ends removably supported on and with one end closed by the supporting means and in which food products are adapted to be received, a cover for the other end of the container, means on the cover disposed within the container and engaging the contents thereof, means for yieldingly exerting pressure upon the cover, and means for directing refrigerant against sides of the container.

13. Apparatus for freezing food products comprising a chamber forming means, food product supporting means in the chamber, a container having open ends removably supported by the supporting means and having a portion of said supporting means received within one end to close the same, said container being adapted to receive food products, and means to direct a refrigerant against the sides of the container in such fashion as to prevent the refrigerant from entering the other end of the container.

MIKAIL T. ZAROTSCHENZEFF.
EARL STAFFORD.
CHARLES H. WELLING.